(12) United States Patent  
Bradin

(10) Patent No.: US 6,566,997 B1  
(45) Date of Patent: May 20, 2003

(54) INTERFERENCE CONTROL METHOD FOR RFID SYSTEMS

(75) Inventor: John P. Bradin, Boulder, CO (US)

(73) Assignee: Hid Corporation, Irvine, CA (US)

( * ) Notice: Subject to any disclaimer, the term of this patent is extended or adjusted under 35 U.S.C. 154(b) by 0 days.

(21) Appl. No.: 09/454,127

(22) Filed: Dec. 3, 1999

(51) Int. Cl.[7] .............................................. H04Q 5/22
(52) U.S. Cl. .................. 340/10.2; 340/3.41; 340/572.1
(58) Field of Search .............................. 340/10.2, 10.1, 340/572.1, 3.41; 370/445

(56) References Cited

U.S. PATENT DOCUMENTS

| | | | |
|---|---|---|---|
| 4,409,592 A | * 10/1983 | Hunt | 340/825.5 |
| 4,751,701 A | * 6/1988 | Roos et al. | 370/85 |
| 5,124,699 A | 6/1992 | Tervoert et al. | 340/825.54 |
| 5,175,537 A | * 12/1992 | Jaffe et al. | 340/825.5 |
| 5,280,435 A | 1/1994 | Weisshaupt et al. | 364/514 |
| 5,294,931 A | 3/1994 | Meier | 342/44 |
| 5,347,280 A | 9/1994 | Schuermann | 342/42 |
| 5,434,572 A | 7/1995 | Smith | 342/44 |
| 5,541,604 A | 7/1996 | Meier | 342/42 |
| 5,550,547 A | 8/1996 | Chan et al. | 342/42 |
| 5,550,548 A | 8/1996 | Schuermann | 342/42 |
| 5,566,359 A | * 10/1996 | Corrigan | 455/78 |
| 5,629,689 A | * 5/1997 | Curwood | 340/902 |
| 5,648,765 A | 7/1997 | Cresap et al. | 340/825.35 |
| 5,673,037 A | 9/1997 | Cesar et al. | 340/825.54 |
| 5,822,714 A | 10/1998 | Cato | 702/108 |

* cited by examiner

Primary Examiner—Julie Lieu  
(74) Attorney, Agent, or Firm—Sheridan Ross P.C.

(57) ABSTRACT

A reader unit for use in a radio frequency identification (RFID) system delays the initiation of an interrogation operation when potentially interfering radio frequency (RF) energy is detected within an operational frequency range of the system. The reader unit waits a quasi-random period of time after the detection and then senses the spectral environment again to determine whether the energy is still present. If the energy is still present, the reader unit waits another quasi-random period and the process repeats. If there is no energy present or the energy is below a threshold value, the reader unit immediately initiates the interrogation operation. By delaying the initiation of the interrogation operation until the operative frequency range is free of potential interferers, the likelihood of harmful interference effects is significantly reduced.

20 Claims, 2 Drawing Sheets

INTERFERENCE CONTROL METHOD FOR RFID SYSTEMS

FIELD OF THE INVENTION

The invention relates generally to radio frequency identification (RFID) systems and, more particularly, to techniques for reducing harmful interference effects in RFID systems.

BACKGROUND OF THE INVENTION

A radio frequency identification (RFID) system is a system that uses radio frequency transponders (i.e., tags) to identify items-of-interest. Each radio frequency transponder is attached to a corresponding item and includes information identifying that item. When an identification needs to be made, a radio frequency reader unit (i.e., an interrogator) is used to excite (i.e., interrogate) the transponder on the item which then transmits an identification signal (including the identification information for the item) back to the reader unit. The reader unit then uses the identification information received from the transponder to perform any of a number of different RFID applications. For example, the identification information can be used to perform functions such as asset management, inventory tracking, access control, and others.

In an RFID system, a problem arises when one or more external interference signals are present within the frequency band of the system during an interrogation operation. Such interference will often cause misidentification of items-of-interest and faulty reporting in the RFID system. Increasingly, such interference is being caused by other RFID readers and/or transponders located near the system-of-interest that operate within the same or a similar frequency band. One method for preventing such interference between RFID systems is to use a master control unit that allocates an operating window for each RFID system to operate within so that, for example, multiple systems do not perform interrogation operations at the same time. Such an approach, however, requires that each of the similarly located systems be under the control of the same host or master, which is not always possible. In addition, such an approach requires that additional wiring and control elements be provided to implement the centralized control. Such systems also generally require reprogramming every time an RFID system is added or removed from the area. Furthermore, it is not always simple to determine when one system will negatively interfere with another from a centralized location. That is, the operational requirements of nearby systems will often differ and, therefore, the effects of interference within a particular system will best be made within the system itself.

Therefore, there is a need for a method and apparatus for reducing the negative effects of in-band interference in an RFID system. The method and apparatus will preferably allow multiple RFID systems to be located near one another with minimal interference effects between systems. Preferably, the method and apparatus will not require a master control unit to control the timing of the multiple neighboring systems. In addition, the method and apparatus should be capable of automatically adapting to changing system conditions and a varying spectral environment.

SUMMARY OF THE INVENTION

The present invention relates to a radio frequency identification (RFID) system that is capable of operating in close proximity to other RFID systems that utilize the same or a similar frequency range, with reduced interference effects. Before initiating an interrogation operation, a reader unit in the system senses the spectral environment surrounding the reader to determine whether there are any potentially harmful interference signals present. If no such signals are present, the reader initiates the interrogation operation immediately. If potentially harmful interference signals are present, the reader unit waits a quasi-random delay period before checking the spectral environment again.

The quasi-random period of time is selected so that another RFID system will normally be able to complete its interrogation operation before the expiration of the quasi-random delay period. After the quasi-random delay period has ended, the reader again checks the spectral environment and, if necessary, waits another quasi-random delay period. Eventually, the reader unit will normally be able to perform its interrogation operation within a relatively clean spectral environment, thereby reducing or eliminating negative interference effects within the reader. If, however, the reader is not able to obtain a clear channel after a number of attempts, the reader can attempt to operate in spite of the interference. The reader can also decide to report the situation to a host for troubleshooting purposes.

DETAILED DESCRIPTION OF A PREFERRED EMBODIMENT

Figure 1:
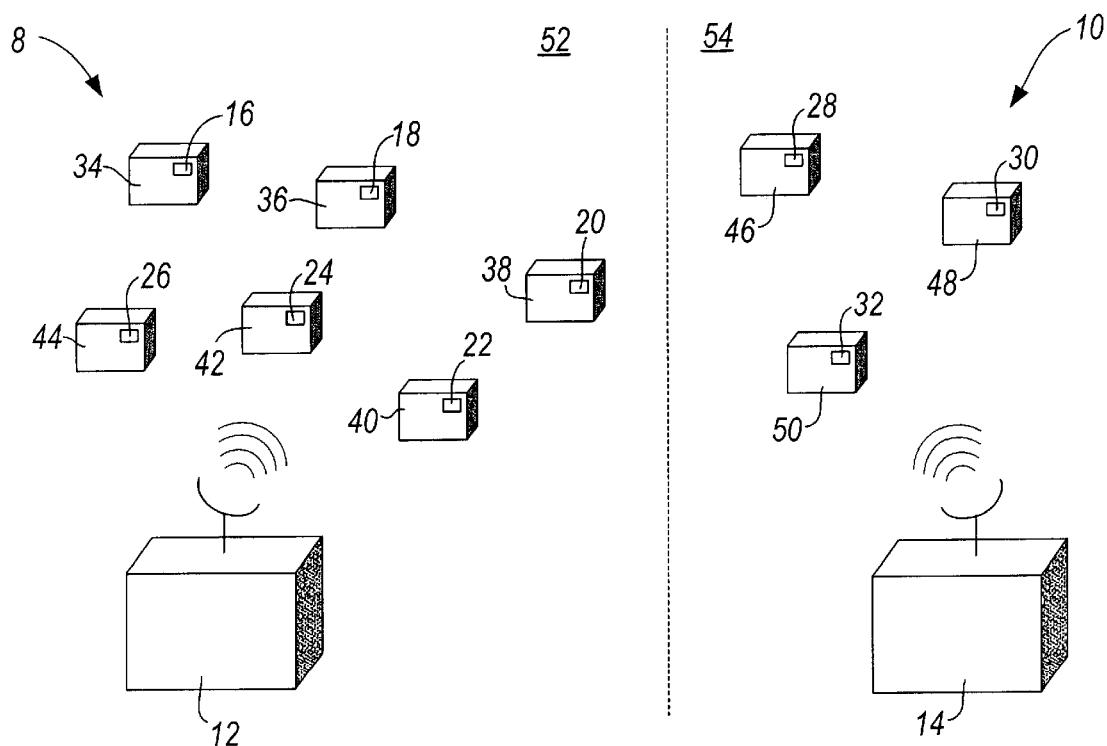
FIG. 1 is a block diagram illustrating an RFID system in accordance with one embodiment of the present invention.

FIG. 1 is a diagram illustrating two neighboring RFID systems 8, 10 that can utilize the principles of the present invention. As illustrated, the first system 8 includes: a first RF reader unit 12 and a first plurality of RF identification tags 16, 18, 20, 22, 24, 26 that are each attached to a corresponding item-of-interest 34, 36, 38, 40, 42, 44 for use in identifying the item-of-interest. Similarly, the second RFID system 10 includes: a second RF reader unit 14 and a second plurality of RF identification tags 28, 30, 32 that are each attached to a corresponding item-of-interest 46, 48, 50. Each of the RF reader units 12, 14 has a respective coverage region 52, 54 in which it tracks the identities of items-of-interest. Thus, as items-of-interest enter and leave the coverage regions 52, 54, the corresponding RF reader units 12, 14 keep track of and report on the changes.

The items-of-interest 34, 36, 38, 40, 42, 44, 46, 48, 50 can include, for example, pieces of inventory, personnel, capital assets, or any other objects that need to be tracked or monitored within a particular region. The number of items that a particular reader is capable of tracking is generally a matter of design choice. The RF reader units 12, 14 can be stationary units, such as wall mounted proximity readers, or portable units that can be easily relocated. In general, the coverage region serviced by an RF reader unit will be a function of the transmit power level of the reader, the antenna pattern of the reader transmit antenna, and the location and orientation of the reader at any particular time. Thus, the coverage regions 52, 54 of the RF readers 12, 14 illustrated in FIG. 1 may change over time.

During normal system operation, the RF reader units 12, 14 each periodically interrogate their respective coverage regions 52, 54 to identify the items-of-interest that are presently located therein. That is, the reader units 12, 14 each periodically transmit an RF interrogation signal within a corresponding coverage region 52, 54 that acts as a "request" for each of the RF tags 16–26, 28–32 within the region to transmit its identification signal identifying the associated item-of-interest. Each of the RF tags within the coverage region receives the interrogation signal and responds by transmitting its identification signal back to the interrogating reader. To prevent signal collisions in the channel between the RF tags and the reader within a particular coverage region, the RF tags each transmit their identification signals after a different quasi-random delay period. When the RF reader receives an identification signal from one of the RF tags, it transmits an acknowledgment signal to that RF tag informing it that its identity has been recorded. After receiving the acknowledgment signal, the identified RF tag does not retransmit its identification signal. If, after transmitting its identification signal and waiting for a predetermined time period, an RF tag does not receive an acknowledgment signal, it assumes that a collision has occurred in the channel and it retransmits its identification signal after another quasi-random delay period. This continues until an acknowledgment signal is received from the reader by each of the RF tags in the coverage region. After receiving identification information from all of the RF tags within its coverage region, the RF reader unit reports the collected information to an appropriate entity.

With reference to FIG. 1, it can be appreciated that some interference between the neighboring systems 8 and 10 is likely to occur. For example, after tag 22 on item-of-interest 40 has been excited by RF reader 12, the identification signal it subsequently transmits could be strong enough to reach RF reader 14 which might then incorrectly report the item-of-interest 40 as being located within region 54. Similarly, if readers 12 and 14 are both transmitting interrogation signals at the same time with the same or similar nominal carrier frequency, they can each create interference within the other that can significantly degrade system performance. For example, if an interrogation signal transmitted by RF reader 14 is sensed within reader 12 while reader 12 is also transmitting an interrogation signal, a slight difference in the carrier frequencies of the interrogation signals can result in the generation of beat (i.e., difference) frequencies within RF reader 12 that fall within the data band of system 8. These beat signals can create an interfering tone in the receiver channel (i.e., the data band) that reduces system performance. In addition, in some circumstances, the RF reader 12 could mistake the beat signals for tag identification information and incorrectly report it.

Figure 2:
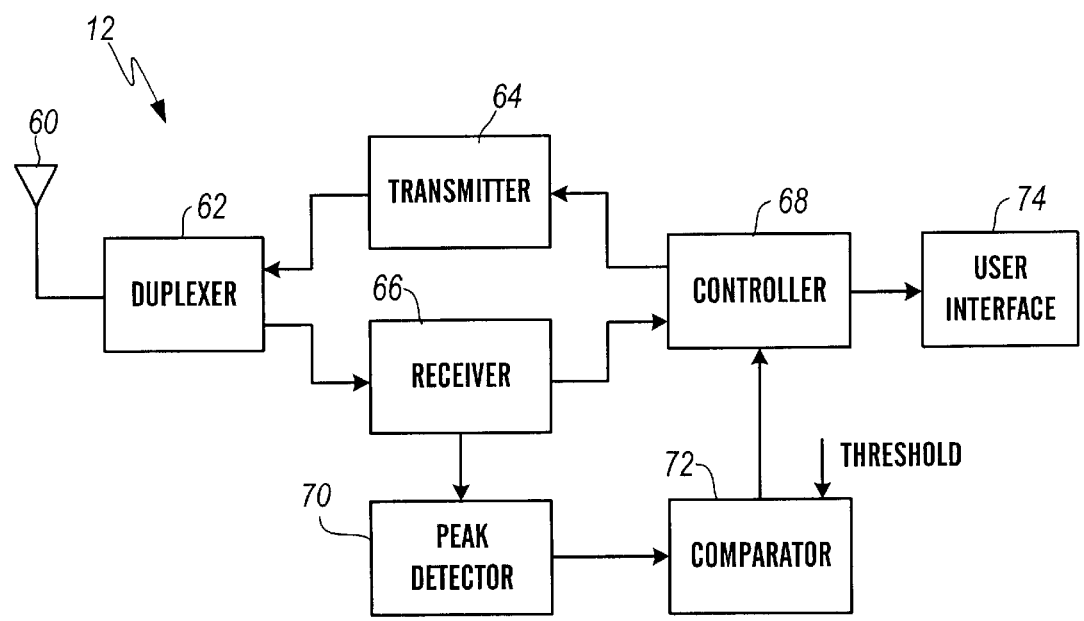
FIG. 2 is a block diagram illustrating a reader unit for use in an RFID system in accordance with one embodiment of the present invention.

In accordance with the present invention, a method and apparatus is provided for reducing the negative effects of interference within an RFID system by delaying interrogation activities within the system when it is determined that potentially harmful interference signals are present in the vicinity of the RF reader unit of the system. FIG. 2 is a block diagram illustrating an RF reader unit 12 in accordance with one embodiment of the present invention. As illustrated, the reader unit 12 includes: an antenna 60, a duplexer 62, a transmitter 64, a receiver 66, a controller 68, a peak detector 70, a comparator 72, and a user interface 74. The controller 68 is operative for controlling the operation of the reader unit 12 in order to interrogate, track, and report on items-of-interest within the coverage region 52 of the reader unit 12. The controller 68 is preferably implemented using a digital processing device, such as a general purpose microprocessor, a digital signal processor, a reduced instruction set computer, a complex instruction set computer, or a field programmable gate array. In addition, one or more of the other functional blocks illustrated in FIG. 2 can also be implemented digitally within the same (or a different) digital processor as the controller 68.

The transmitter 64 is used to generate interrogation signals (under the control of the controller 68) for transmission into the coverage region 52 via antenna 60 during an interrogation operation. The transmitter 64 can also be used to generate an acknowledgment signal for delivery to a specific RF tag after identification information has been received from the tag, as described above. The receiver 66 is operative for, among other things, receiving, demodulating, and decoding identification signals received from RF tags located within the coverage region 52 and for delivering the resulting identification information to the controller 68.

The duplexer 62 is a device that allows the transmitter 64 and the receiver 66 to share the same antenna 60. As is well known in the art, duplexers can take a number of different forms, from relatively simple structures to relatively complex structures. For example, devices such as circulators and transmit/receive switches are often used. In addition, the type of duplexer will usually depend upon whether full-duplex or half-duplex communications is involved. For example, in a full-duplex system using different transmit and receive frequencies, methods such as spectral filtering, cancellation techniques, and mechanical nulling are usually used to separate the transmit and receive channels. In an alternative embodiment, separate transmit and receive antennas are used within the reader 12, thus dispensing with the need for duplexer 62.

As the controller 68 collects tag identification information from the corresponding coverage region 52, it reports the data to an appropriate entity via user interface 74. Alternatively, the controller 68 can wait until all of the tag information has been collected for the coverage region 52 before it reports the data. The user interface 74 can take many different forms depending upon the type of reporting being done within the system. For example, the interface 74 can be coupled to a video display for displaying the identification data to an operator. Alternatively, the interface 74 could include a modem for transferring the data to a remote computer for storage. In a preferred approach, each of the reader units in a large RFID system are coupled via corresponding user interfaces 74 to a central control processor that assembles, manages, and analyzes the identification information from the individual readers to generate a system wide report. The central control processor can also use the information to perform other system functions such as activating electric door locks, sending messages to user displays (including a display on the reader itself), sounding alarms, and activating recording devices (e.g., a video camera). Other forms of user interface 74 can also be used.

Before the controller 68 initiates an interrogation operation, it activates the receiver 66 to monitor the spectral environment surrounding the reader 12. If an RF signal is detected within the bandwidth of the receiver 66, the signal is transferred to the peak detector 70 which determines the peak signal strength of the RF signal. An indication of the peak signal strength is then delivered to the comparator 72 which compares the peak signal strength of the received signal to a threshold value. The output of the comparator 72 is a binary signal that indicates whether or not the peak signal value exceeds the threshold value. The controller 68 uses the output signal of the comparator 72 to determine when the interrogation operation is to be initiated.

If the output signal of the comparator 72 indicates that the peak RF signal strength detected by the receiver 66 is below the threshold value, the controller 68 immediately initiates the interrogation operation (i.e., the controller 68 causes the transmitter 64 to generate and transmit an interrogation signal). If, on the other hand, the output signal of the comparator 72 indicates a peak RF signal strength above the threshold value, the controller 68 delays initiation of the interrogation operation for a quasi-random delay period. The quasi-random delay period is selected so that other nearby systems will be able to complete their operations before the quasi-random delay period has expired. After the quasi-random delay period has ended, the controller 68 again checks the output signal of the comparator 72 and the process is repeated. Eventually, the spectral environment about the reader 12 will be in a condition that allows the interrogation operation to be performed with minimal chance of harmful interference effects. The controller 68 can include a log counter to keep track of how many attempts have been made before each interrogation operation has been performed. The controller 68 can also decide to postpone an interrogation operation indefinitely if more than a predetermined number of attempts have been made at one time. Furthermore, the controller 68 can report information to a central control processor regarding a consistently or intermittently hostile spectral environment.

The threshold value used by the comparator 72 is preferably selected based on signal levels that have been determined to pose a significant risk of harmful interference effects. Thus, low level interference that is not likely to cause problems will generally be ignored by the system. The threshold value can be a constant value that is set at the time of manufacture or the threshold value can be a dynamic quantity that can be adjusted by the controller 68 during system operation. By using an adjustable value, the system can adapt to a changing environment or changing system conditions.

In an alternative embodiment of the invention, the comparator 72 is replaced by an analog to digital (A/D) converter (not shown) which delivers a digital value to the controller 68 that is indicative of the peak signal strength detected by the receiver 66. The comparison with a threshold value can then be performed digitally within the controller 68. Alternatively, the controller 68 can implement a more complex algorithm for determining when to initiate the interrogation operation. In addition, the A/D approach allows the controller 68 to collect a rich suite of diagnostic data regarding the timing and strength of interferers about the RF reader 12. This historical data can later be used to identify repeating periods of non-interference during which interrogation operations can be scheduled. The ability of the controller 68 to store time-stamped events also reduces subsequent troubleshooting efforts involving interfering sources or malfunctioning equipment.

In a preferred approach, all of the RF readers that are operative within a particular locale will use the above-described principles to determine when to initiate corresponding interrogation operations. If this is the case, the readers will eventually be able to anticipate when the other units will be interrogating and they will be able to tailor their interrogation activities to avoid conflicts. In this manner, a form of pseudo time division multiplexing (DM) is achieved without the need for a complex master control entity controlling system timing. The readers can also be programmed to adapt to a changing environment, such as when one or more surrounding readers is reprogrammed or moved to a different location.

Figure 3:
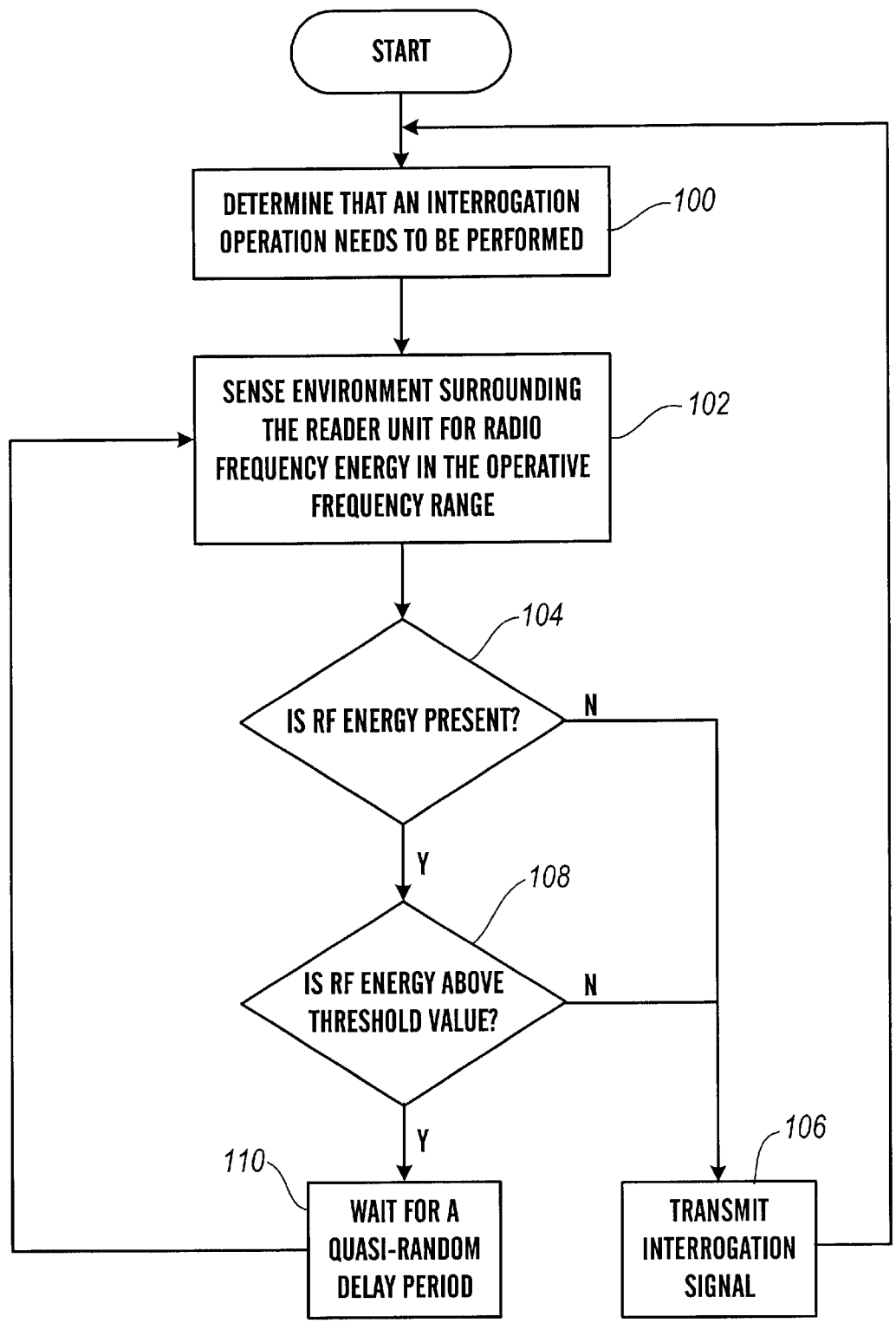
FIG. 3 is a flowchart illustrating a method for use in operating a reader unit within an RFID system in accordance with one embodiment of the present invention.

FIG. 3 is a flowchart illustrating a method for managing interrogation activity in an RF reader unit in accordance with one embodiment of the present invention. As illustrated, it is first determined that an interrogation operation needs to be performed by the reader unit (step 100). This determination can be made automatically by the reader unit (e.g., according to a programmed schedule) or the reader unit can be instructed to perform an interrogation operation by an external entity (e.g., an operator). The reader unit then senses the surrounding spectral environment to determine whether any radio frequency energy exists within an operative frequency range (step 102). The operative frequency range will be selected based on the particular application. In a half-duplex RFID system (i.e., a system where the RF reader unit and the RF tags use the same transmit carrier frequency and must thus transmit at different times from one another), the operative frequency range that is monitored is preferably the region surrounding the single carrier frequency of the system. In a full-duplex system (i.e., a system in which the RF reader and the RF tags transmit using different carrier frequencies and can thus transmit simultaneously), the operative frequency range that is monitored will preferably include the regions surrounding both the RF reader and the RF tag transmit carrier frequencies. As described previously, in one embodiment of the invention, the operative frequency range that is monitored is the receive band of the receiver 66 of the reader unit 12. It should be appreciated, however, that a separate sensor could be provided for detecting the present of RF energy in a frequency range different from that of the receiver used to receive the tag identification signals and, therefore, the invention is not limited to the use of the receiver bandwidth as the operative frequency range.

Referring back to FIG. 3, if RF energy is not detected within the operative frequency range, an interrogation signal is transmitted immediately by the reader unit (steps 104, 106). If RF energy is present, it is next determined whether the strength of the in band RF signal is above a predetermined threshold value (step 108). If the RF signal strength is not above the threshold value, an interrogation signal is transmitted immediately by the reader unit (step 106). If the RF signal strength is above the threshold value, a quasi-random delay period is initiated (step 110). After the quasi-random delay period has expired, the process returns to the sensing step 102 and the spectral environment about the reader unit is again sensed. This process is continued until it is determined that there is no potentially harmful RF energy within the operative frequency range. The interrogation signal is then transmitted. After the interrogation signal has been transmitted by the reader unit (step 106), the reader unit waits for identification signals to be received from the tags within the corresponding coverage region. The process eventually returns to the beginning and the RF reader unit waits for another interrogation determination to be made.

Although the present invention has been described in conjunction with its preferred embodiments, it is to be understood that modifications and variations may be resorted to without departing from the spirit and scope of the invention as those skilled in the art readily understand. For example, the principles of the present invention can be used with virtually any form of RFID reader unit, including portal reader and handheld reader units. The RFID system implementing the inventive concepts can utilize virtually any form of multiple access scheme between the reader and the associated tags and is not limited to multiple access schemes described above. In addition the inventive principles can be used in RFID systems performing a wide range of different RFID applications, such as asset management, access control, inventory tracking, and others. Such modifications and variations are considered to be within the purview and scope of the invention and the appended claims.

What is claimed is:

1. A reader unit for use in a radio frequency identification (RFID) system having a plurality of radio frequency (RF) tags, said reader unit comprising:
   a transmitter for periodically generating an interrogation signal for transmission to the plurality of RF tags during an interrogation operation, said interrogation signal for causing at least one of said RF tags to transmit an identification signal back to said reader unit;
   a radio frequency (RF) sensor for sensing, during an inactive state of said transmitter, the presence of RF energy within an operational frequency range of the RFID system in an environment surrounding said reader unit; and
   a delay unit for delaying initiation of an interrogation operation when said RF sensor indicates the presence of RF energy satisfying a predetermined condition within said operational frequency range of the RFID system.

2. The reader unit, as claimed in claim 1, wherein:
   said delay unit delays initiation of said interrogation operation for a quasi-random delay period.

3. The reader unit, as claimed in claim 2, wherein:
   said quasi-random delay period is selected to allow another RFID system to complete a corresponding interrogation operation before expiration of said quasi-random delay period.

4. The reader unit, as claimed in claim 2, wherein:
   said delay unit checks said RF sensor after said quasi-random delay period to determine whether RF energy satisfying said predetermined condition is still present and, if so, delays initiation of said interrogation operation for another quasi-random delay period.

5. The reader unit, as claimed in claim 1, wherein:
   said interrogation signal has a first carrier frequency; and
   said operational frequency range of said RFID system includes said first carrier frequency.

6. The reader unit, as claimed in claim 1, wherein:
   said identification signal transmitted back to said reader unit has a second carrier frequency; and
   said operational frequency range of said RFID system includes said second carrier frequency.

7. The reader unit, as claimed in claim 1, further comprising:
   a receiver for receiving said identification signal transmitted back to said reader unit from said at least one RF tag, wherein said operational frequency range of said RFID system includes an operational bandwidth of said receiver.

8. The reader unit, as claimed in claim 1, wherein:
   said predetermined condition includes said RF energy sensed by said RF sensor exceeding a predetermined threshold value.

9. The reader unit, as claimed in claim 8, further comprising:
   a threshold generator for dynamically varying said predetermined threshold value based on changing system conditions.

10. A method for managing interrogation activities in a radio frequency identification (RFID) system having an RF reader unit and a plurality of RF tag devices, said method comprising the steps of:
    determining that an interrogation operation needs to be performed in the RFID system, said interrogation operation requiring the transmission of an interrogation signal from the RF reader unit to the plurality of RF tag devices;
    checking a spectral environment about the reader unit to determine whether an RF signal meeting a predetermined criterion exists within an operative frequency range of the RFID system;
    when an RF signal meeting the predetermined criterion does not exist within the operative frequency range of the RFID system, immediately transmitting said interrogation signal;
    when an RF signal meeting the predetermined criterion does exist within the operative frequency range of the RFID system, delaying transmission of the interrogation signal for a quasi-random delay period; and
    when transmission of the interrogation signal has been delayed a predetermined number of times, transmitting said interrogation signal regardless of whether an RF signal meeting the predetermined criterion does exist within the operating frequency range of the RFID system.

11. The method, as claimed in claim 10, further comprising:
    second checking the spectral environment about the reader unit to determine whether an RF signal meeting the predetermined criterion exists within the operative frequency range of the RFID system after the quasi-random delay period has expired; and
    immediately transmitting said interrogation signal when said step of second checking indicates that an RF signal meeting the predetermined criterion does not exist within the operative frequency range of the RFID system.

12. The method, as claimed in claim 10, wherein:
    said predetermined criterion includes a peak value of said RF signal exceeding a predetermined threshold value.

13. A method for use within a radio frequency identification (RFID) system having an RF reader unit and a plurality of RF tag devices, said method comprising the steps of:
    determining that an interrogation operation needs to be performed in the RFID system, said interrogation operation requiring the transmission of an interrogation signal from the RF reader unit to the plurality of RF tag devices;
    measuring a magnitude of radio frequency (RF) energy in a region surrounding the RF reader unit;
    comparing said magnitude of said RF energy to a predetermined threshold value; and
    transmitting said interrogation signal from said RF reader unit to said plurality of RF tag devices when said magnitude of said RF energy is less than said predetermined threshold value.

14. The method claimed in claim 13, further comprising:
    delaying transmission of said interrogation signal from said RF reader unit when said magnitude of said RF energy exceeds said predetermined threshold level.

15. The method claimed in claim 13, wherein:
    said step of measuring a magnitude of RF energy includes detecting RF energy in a receiver and determining a peak value of said detected RF energy in a peak detector.

16. The method claimed in claim 13, further comprising:

repeating said steps of measuring and comparing until said magnitude of said RF energy is less than said predetermined threshold value or a predetermined number of repetitions have been performed.

17. The method claimed in claim 16, further comprising:

transmitting said interrogation signal from said RF reader unit to said plurality of RF tag devices regardless of whether said magnitude of said RF energy is less than said predetermined threshold value when it is determined that a continuously hostile spectral environment exists about the RF reader unit.

18. The method claimed in claim 16, wherein:

said RF reader unit determines that a continuously hostile spectral environment exists about the RF reader unit when said repeating step ends before said magnitude of said RF energy drops below said predetermined threshold value.

19. The method claimed in claim 18, further comprising:

reporting said continuously hostile spectral environment to a central location when said RF reader unit determines that a continuously hostile spectral environment exists about the RF reader unit.

20. The method claimed in claim 13, further comprising:

collecting information regarding a spectral environment about said reader unit using said magnitude measured in said measuring step; and reporting said information to a central location.

\* \* \* \* \*